United States Patent
Wellen et al.

(10) Patent No.: US 11,487,246 B2
(45) Date of Patent: Nov. 1, 2022

(54) DIGITAL COIN TIMEPIECE FOR TACTILELY DETERMINING ELAPSED TIME

(71) Applicants: Alexander Wellen, Redondo Beach, CA (US); David James Prince, Saint Paul, MN (US)

(72) Inventors: Alexander Wellen, Redondo Beach, CA (US); David James Prince, Saint Paul, MN (US)

( * ) Notice: Subject to any disclaimer, the term of this patent is extended or adjusted under 35 U.S.C. 154(b) by 285 days.

(21) Appl. No.: 16/641,407

(22) PCT Filed: Sep. 24, 2018

(86) PCT No.: PCT/US2018/052399
§ 371 (c)(1),
(2) Date: Feb. 24, 2020

(87) PCT Pub. No.: WO2019/060815
PCT Pub. Date: Mar. 28, 2019

(65) Prior Publication Data
US 2020/0241477 A1    Jul. 30, 2020

Related U.S. Application Data (60) Provisional application No. 62/703,151, filed on Jul. 25, 2018, provisional application No. 62/563,021, filed on Sep. 25, 2017.

(51) Int. Cl.
| | |
|---|---|
| *G04B 25/02* | (2006.01) |
| *G04G 21/08* | (2010.01) |
| *G06F 3/01* | (2006.01) |
| *G06F 3/041* | (2006.01) |

(52) U.S. Cl.
CPC ............ *G04B 25/02* (2013.01); *G04G 21/08* (2013.01); *G06F 3/016* (2013.01); *G06F 3/0412* (2013.01)

(58) Field of Classification Search
CPC ....... G04B 25/02; G04G 21/08; G04G 9/0041
See application file for complete search history.

(56) References Cited

U.S. PATENT DOCUMENTS

| | | | |
|---|---|---|---|
| 3,968,639 A * | 7/1976 | Berets ...................... | G04G 9/06 324/94 |
| 4,172,359 A | 10/1979 | Gorsky et al. | |
| 6,421,302 B1 * | 7/2002 | Wimberly ............ | G04G 9/0082 368/228 |
| 6,462,720 B1 | 10/2002 | Yamashita et al. | |

(Continued)

OTHER PUBLICATIONS

International Search Report for PCT/US2018/052399 dated Dec. 27, 2018.

*Primary Examiner* — Sean Kayes
(74) *Attorney, Agent, or Firm* — Polsinelli PC (57) ABSTRACT

A digital coin timepiece that generates a tactile presentation which indicates elapsed time including a body member that includes a tactilely readable display surface that provides haptic feedback comprising first vibrations in a first location on the display surface when the tactilely readable display surface is touched by a user, with the first vibrations providing haptic feedback representing an actual minute or elapsed minutes so that the user can determine the actual or approximate time without having to view the display surface.

25 Claims, 7 Drawing Sheets

(56) References Cited

U.S. PATENT DOCUMENTS

| | | | |
|---|---|---|---|
| 8,164,985 B2* | 4/2012 | Su | G04G 9/042 |
| | | | 368/240 |
| 8,588,032 B2* | 11/2013 | Geyer | G04G 17/083 |
| | | | 368/240 |
| 9,454,228 B2 | 9/2016 | Wellen | |
| 9,552,707 B1* | 1/2017 | Bala | G08B 6/00 |
| 10,135,379 B2* | 11/2018 | Iwahashi | G05B 19/418 |
| 2006/0062089 A1* | 3/2006 | Lizzi | G04G 9/02 |
| | | | 368/240 |
| 2012/0307603 A1 | 12/2012 | Bongio et al. | |
| 2017/0357321 A1* | 12/2017 | Fleizach | G04G 13/00 |

* cited by examiner

DIGITAL COIN TIMEPIECE FOR TACTILELY DETERMINING ELAPSED TIME

RELATED APPLICATIONS

This application is a National Stage Entry Application of PCT/US2018/052399, filed Sep. 24, 2018, which claims the benefit of U.S. provisional applications No. 62/703,151, filed Jul. 25, 2018 and 62/563,021 filed Sep. 25, 2017, the entire contents of each of these applications are incorporated herein by reference.

FIELD OF THE INVENTION

The invention relates to a digital coin timepiece that allows the user to tactilely determine the approximate time or elapsed time by contacting a display surface that provides haptic feedback in the form or vibrations.

BACKGROUND OF THE INVENTION

Wrist and pocket watches have been developed that are readable by touch alone for the visually impaired or in the dark via a combination of protuberances, studs, projections, annular slots, discs and plates (U.S. Pat. Nos. 365,032, 360,641, 1,222,369 and 2,168,314). Other watches deliver time information by employing a silent vibration device (U.S. Pat. Nos. 5,559,761 and 6,052,339), square-areas, cursors, and symbolic codes (U.S. Pat. No. 5,311,487) and Braille (U.S. Pat. No. 2,091,146).

Other developments include timepieces that provide a readily interpretable tactile display of the time, preferably without requiring the user to learn a complex code and can easily be read by both a visually impaired or sighted person. U.S. Pat. No. 7,079,454 discloses a display comprises a display area and at least one moveable portion within the display. The moveable portion is moveable with respect to the display to form at least one displayed character that is recognizable by touch by a user and has a tactilely detectable shape that is independent of a system of dots. Others in the industry are exploring ways to use magnetized ball bearings to represent the hour and minute hands of a watch.

More and more, however, individuals are routinely obtaining the time not via a physical wristwatch or timepiece but rather a digital consumer device, particularly mobile devices. Meanwhile, the field of haptic or tactile feedback technology has advanced significantly in recent years enabling an individual to touch a smooth surface or touch screen interface and experience the sensation of touching a physical object. In the past, a tool or stylus was required to reproduce the simulation, but now haptic textures can be read via an individual's finger or fingertips. Devices can now record the force, speed, acceleration, vibrations, and motions of a user in connection with a real object and those attributes can then be used to simulate or recreate the tactile sensation of touching that object through electromechanical or electromagnetic actuators, electrovibrations or reverse-electrovibrations, and other haptic technology. For example, Disney's TeslaTouch uses electrovibrations such that "when a finger is placed on the surface of the touch panel, a periodic motion of the electrical charges is induced in the tip of the finger. This results in a periodic attraction force between the finger and the panel modifying the friction between the sliding finger and the panel and thus producing a sensation of tactile texture."

A method is needed that can provided a sighted or visually impaired person the ability to tactilely read the time or the approximate time on a smooth surface or touch screen readily without having to view the device.

SUMMARY OF THE INVENTION

The invention relates to a digital coin timepiece that generates a tactile presentation which indicates elapsed or actual time. This timepiece comprises a body member that includes a tactilely readable display surface that provides haptic feedback comprising first vibrations in a first location on the display surface when the tactilely readable display surface is touched by a user. These first vibrations provide haptic feedback representing the actual minute or elapsed minutes so that the user can determine the actual or approximate time without having to view the display surface.

The invention also relates to a method that generates a tactile presentation which indicates elapsed time on a digital coin timepiece. This method comprises providing a digital coin timepiece as disclosed herein; and generating first vibrations that vary in response to elapsed minutes to provide haptic feedback to indicate a tactile presentation of minutes or elapsed minutes so that the user can determine the approximate time without having to view the display surface.

The haptic feedback preferably comprises one first vibration to indicate the first 15 minutes after an hour, two second vibrations to indicate between 15 and 30 minutes after the hour, three third vibrations to indicate between 30 and 45 minutes after the hour and four fourth vibrations to indicate between 45 and 60 minutes after the hour. The digital coin advantageously comprises a concave surface for contact to obtain haptic feedback and a raised circumferential border; wherein four spaced round windows are located on the border with each window corresponding to one of the 15 minute time periods, and wherein each window is illuminated with an LED light to indicate which 15 minute time period is occurring. If desired, the border can include windows at each hour position wherein the window emits an LED light to indicate each particular 5 minutes of elapsed time. Generally, however, the user is aware of the hour so that no indication of the hour is needed. In a preferred embodiment, the timepiece and method allow for the display surface to provide haptic feedback comprising second vibrations in a second location different from the first location with the second vibrations and location indicative of a particular hour so that the user can determine the time of day as to the actual minute or elapsed minutes along with the particular hour without having to view the display surface.

Also, either the first or second vibrations or both vibrations may be configured to emulate either a numeric character, minute and hour hands or a discernable shape in a sector location disposed on a portion of the display surface, with 2, 3, 4, 6 or 10 locations provided to represent groupings of 30, 20, 15, 10 or 5 minutes, respectively.

The various vibrations are typically achieved by configuring the display surface to include a glass plate that is topped with a transparent electrode and an insulator, so that when the insulator is contacted by a user's finger, electrical impulses are generated to provide the vibrations as haptic feedback. Alternatively, the vibrations can be created by a haptic motor inside the device that is activated so that the vibrations are felt in response to the physical capacitance touch to the surface.

Generally, the tactile representation of the current time includes at least one of the following: a clock, numbers, symbols, shapes, or characters. For example, the tactile representation of the current time may be represented as a combination of numbers, letters, and characters, such as 11:05 PM. The current time may also include different clock faces and aspects, such as hour hands, minute hands, hour and minute place holders, etc. The current time may also be represented by different recognizable symbols or shapes, such as triangles, circles, squares, etc. The current time may also be represented by different characters, such as letters or other characters. Preferably one or both of the body member and display surface are round. It is also preferred that the digital coin timepiece can be configured to be a flat, concave or convex surface with no other symbols and that responds to touch to provide any of the indications of time or elapsed time that are described herein.

It is also possible for the tactile presentation of the current time to be activated when desired by touching, pressure to, or rubbing on a portion of the display surface. The digital coin timepiece may include sensors or other sensory devices that detects pressure, sustained touch, or friction and is responsive to such pressure, sustained touch, or friction by activating the tactile functionality of the display surface. The timepiece would then communicate the tactile presentation of the elapsed minutes or current time to the user. This embodiment avoids battery drain or other inefficiencies in operation that could be present if the tactile functionality was continually active. Another embodiment includes pressing a button to activate the tactile presentation of the elapsed minutes or current time.

While the invention is fully operable when only the minute or elapsed minutes are displayed tactilely, it is preferred to indicate the current time in both hour and minutes of the day so that a user can determine the exact time of day without having to view the display surface. And in addition to the tactile representations of time, it is also possible to have the tactile portions of the display surface light up or be provided in a different color than the rest of the display surface so that the digital coin timepiece can also be viewed to determine time or elapsed time.

BRIEF DESCRIPTION OF THE DRAWINGS

Elements of the preferred embodiments below that can be mixed and matched are shown in the appended drawings wherein.

DETAILED DESCRIPTION

The present method and device will be described in connection with the appended drawing Figures, it being understood that the detailed description and Figures are for illustrative, non-limiting purposes. Accordingly, in the following description, the digital coin time piece will be illustrated as a circular, disc shaped body member which imitates that of a conventional watch face. It is contemplated, however, that the digital coin timepiece of the present invention can take any shape. The body member as well as the display surface individually may be round, oval, or polygonal, preferably square or rectangular, with rounded corners. A concave or convex surface can also be provided for the body member, if desired. While each of the Figures is presented as a front view, the depth of the body member would be sufficient to house the necessary components for calculating time as well as for appropriately operating the display surface. Preferred dimensions for a disc shaped body member would be between 1 and 2 inches in diameter (or width or length) and a depth of about ⅛ to ⅓ inch.

In a preferred embodiment, the display surface is a touch screen which, after being activated and contacted by a user's finger, will typically generate vibrations that indicate the minute or elapse minutes of time so that as noted herein the user can ascertain the time or approximate time without having to view the display surface. And instead of a touch screen, the invention is operable with any device or display surface that is capable of providing haptic feedback in the form of vibrations to at least represent the minutes or approximate minutes after the hour.

As the technologies for operating a touchscreen, configuring activation buttons, accessing a device by fingerprint identification and related electronic features are well known in the art, there is no need to further describe the electronic and software components of these items herein.

Figure 1:
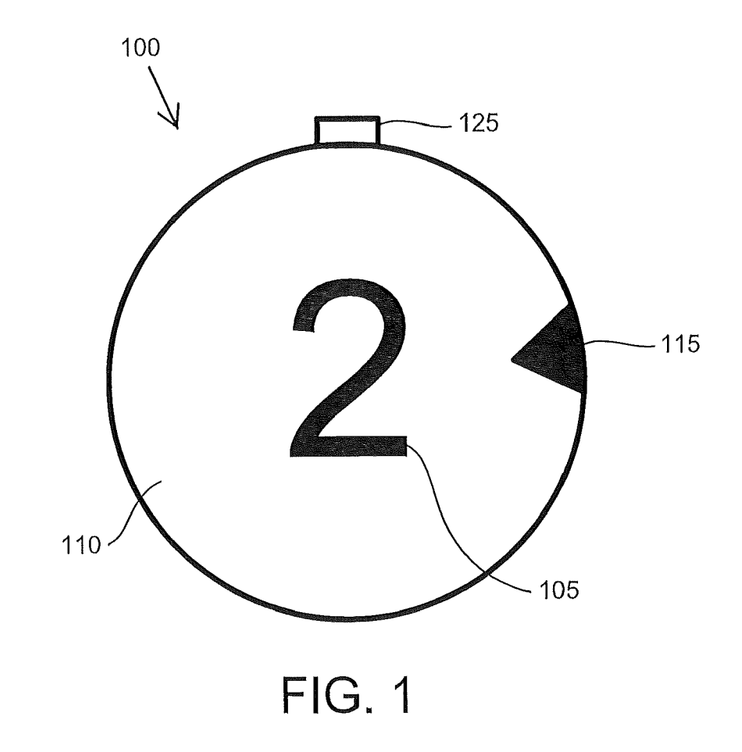
FIG. 1 is a front view of an exemplary embodiment that shows a digital coin timepiece with the hour largely displayed tactilely above or below the surface and the minutes provided by a vibrating shape located around the edge of the edges of the display surface consistent with the position of an analog clock.

With reference to FIG. 1, illustrated is an exemplary digital coin timepiece 100 for generating a tactile presentation that indicates time. FIG. 1 illustrates a display surface that shows the hour 105 largely displayed tactilely above or below the display surface 110 with the minutes indicated by a vibrational area 115 that would be located around the edge of the display surface 110 consistent with the corresponding positions of an analog clock.

The digital coin timepiece 100 may also include a button 125 that may be used to activate the tactile presentation of the minute or elapsed minutes. This button also helps to orient the digital coin timepiece so that the user can understand what minutes are being indicated by the vibrations and haptic feedback that is provided. And while the button 125 is shown as protruding from a sidewall of the digital coin timepiece 100, it can also be mounted flush with or slightly within the sidewall so that the digital coin timepiece has a smooth sidewall appearance. The button can also be provided on the rear surface of the body member again for purposes of orientation as well as activation of the device. It can also be provided as a fingertip engaging depression as is currently provided on mobile phones that operate either by being depressed or by simply being touched by the user's fingertip. If desired, although not critical to the invention, the activation switch button can respond to the user's fingerprint as a security feature when the digital coin timepiece includes other sensitive or private information. This would be useful when the digital coin timepiece also includes other software or information that the user does not wish to share with anyone else.

In other embodiments, the user can simply apply pressure to the display surface to activate the tactile presentation. It is also possible to configure the display surface to become active as the user touches the surface or rubs his or her finger over the surface. Rubbing in a particular direction can also be used to orient the device so that the direction of rubbing indicates a particular orientation, e.g., 12:00. The same is possible with the application of pressure wherein the point where the pressure is applied to the circumference of the display surface will be the orientation point for a particular time position (again, e.g., 12:00).

Allowing the tactile presentation to remain dormant until activated is an important battery saving feature that is key for devices such as this digital coin timepiece. These types of devices typically run on batteries and energy saving techniques are therefore desirable. In one embodiment, the digital coin timepiece is in a locked state. A locked state indicates that no touching or contact of the touch screen will activate actions or buttons of the device, other than designated buttons or actions. Therefore, if the device is in a locked state, it may be easier to determine if a user wishes to activate the tactile presentation and easier for the user to tactilely read the presentation without triggering other actions or response. Although, it is not required for the mobile device to include a locked state or to be in a locked state for the tactile presentation to be read.

It should be appreciated that the hour 105 may be displayed in multiple different formats, such as shapes or other characters. In this example, the hour 105 displays a '2' indicating that the hour is 2:00. Also, the minute vibrational area 115 in this exemplary example is represented by a triangle at one quarter after the hour, thus setting the time at 2:15. The user would certainly know whether it is 2:15 AM or PM so the latter designations are not needed although a separate indicator can be provided to indicate whether it is AM or PM. It should be appreciated that the minute 115 may also be represented by other shapes, characters, numbers, symbols, etc. Also, the hour 105 and minute 115 are not limited to the positions on the display surface 110 illustrated in FIG. 1 as they are instead positioned analogous to a clock face.

In other embodiments, the minute vibrational area 115 can be located in a particular position and it can pulse to inform the user of the elapsed time. While each pulse can indicate, e.g., one minute, it is also envisioned to provide pulses of different length with, e.g., a longer pulse indicating 10 or 15 minute increments with shorter pulses indicating single minutes. Thus, three long pulses and three short pulses would indicate 48 or 33 minutes depending upon whether the long pulses represent 15 or 10 minutes. These can be set by the user or can be pre-programmed in the timepiece.

The shape of the minute vibrational area 115 is not critical and although shown as a triangle, it could be a different polygon, circle, or oval shape, or it could be a different shape or indicator, such as a bar, dash, line or dot that vibrates or that is raised or depressed to indicate the minute or elapsed minutes.

When the tactile presentation of the current time is activated, it provides a user the ability to tactilely read the current time or approximate time across the display surface by any person, sighted or visually impaired, preferably without learning any substantial code system.

The display surface it typically flay but it could be curved and of any size or shape. The ability to tactilely read the current time may be useful in situations where there is low light or the user does not wish to draw attention to themselves by checking the time.

The tactile presentation may include at least one displayed character that simply represents the minute and/or the hour. The tactile presentation can be easily read tactilely by moving a finger or fingers across the displayed character(s). The displayed character(s) is recognizable by touch by a user's finger as if it were slightly raised, elevated or slightly depressed from the display surface. On a digital display or touch screen, the displayed character(s) can be skeuomorphically represented as a digital or analog clock or through a tactically sensible shape that is independent of an interpretation system based on dots or Braille. For example, the shape is neither a Braille character nor the shape of several dots that need to be added together or that form a certain dot-dash arrangement that would need to be interpreted to obtain what number it represents.

The tactile presentation provides a small static force to control friction between a user's finger and the touch screen. The frequency of the vibration and the touch screen is carefully tuned so that the tactile presentation can actually create the feeling of a texture to a user's finger on a smooth, glass-like surface. This is referred to as "haptic feedback," which is defined as impulses that stimulate the sense of touch. Small electronic impulses are used to create a push and pull between a person's fingertip and the touch screen. Haptic feedback is a tactile feedback technology which takes advantage of the sense of touch by applying forces, vibrations, or motions to the user. The vibrations that may ultimately result in the tactile feedback being also achieved by forces or motion.

For example, a typical display surface in the form of a touch screen includes three layers: a glass plate, a transparent electrode and an insulator. To simulate friction and texture, the electrode creates small electrical fields in the insulation layer. These fields oscillate between positive and negative charges, which create the sensation of friction and texture on the touch screen surface.

In order to activate the tactile presentation, the transparent electrode layer is excited with a periodic electrical signal applied to the connectors normally used by a position-sensing driver. A position-sensing driver indicates the position being activated by touch on the touch screen. When an input signal of sufficient amplitude is provided, an electrically induced attractive force develops between a user's finger and the underlying electrode of the transparent electrode layer. This increases the dynamic friction between the finger and the panel surface (or touch screen) and, this causes the feeling of an object on the touch screen.

And instead of a touch screen, the invention is operable with any device or display surface that is capable of providing haptic feedback in the form of vibrations that represent minutes, elapsed minutes of approximate minutes after the hour. Such display surfaces are known in the art, e.g., as in U.S. Pat. Nos. 4,197,697, 6,734,790 and 7,050,360 the entire contents of which are expressly incorporated herein by reference.

Examples of the displayed character(s) are geometrical or belongings to a traditionally sight-based alphanumeric system. The different characters can comprise Arabic numbers, Latin letters, or other letters and numbers from a visual writing or numerical system. The different characters can also comprise geometric shapes that are distinguishable by finger touch, and the preferred geometrical shapes have less than eight sides to facilitate interpretation by an unskilled user.

The displayed character(s) can comprise one of a group of different characters representing preselected times kept by the clock device and one embodiment of the displayed character can be configured to be identified by the user based on its orientation and discrete position in the display area. The preferred characters to be used, however, are configured to be identified by their shape, preferably regardless of their position or orientation. At least two different characters would work but at least five different characters allows for an easier and quicker read. To facilitate interpretation by an untrained user, the shape is preferably sufficiently large to be readily determined by touch and identified as a recognizable and familiar character by a normally-sighted user.

In one embodiment, the shape of the moveable portions can otherwise be circles, triangles, or other shapes that are readily employable together to cooperatively form the desired displayed character(s). At least some or all of the characters can be displayed on substantially the same location in the display area. The displayed characters can all comprise a single digit or shape, or alternatively multiple digits or shapes. Also, the size of the character(s) may vary. It may be an option that a user selects how large or small the tactile presentation is to be displayed.

In another embodiment, a gyroscope, accelerometer, and/ or compass as part of a mobile device may be utilized. Utilizing these components can also take into account the orientation of the device to properly establish a precise and reliable method and position to tactilely read the time. For example, the time would be upright and readable regardless of how the individual placed the mobile device in their pocket, user touches, slides, or applies pressure, force, or friction to the surface once or repeatedly with a finger or fingers in one area of the touch screen to cause the displayed time to appear and be easily read tactilely underneath or somewhere on the touch screen. Alternatively, the user can lock the orientation of the smooth surface or touch screen to create a consistent readability.

In one embodiment, the location of the displayed time on the display surface or touch screen appears where the user touches, rubs, or applies pressure to the surface. For example, if the user reaches into his or her pocket, the tactile time appears, is sized, and/or is properly oriented and readable wherever the person presses, rolls, or slides his or her finger or fingertips across the surface.

In another embodiment, the displayed character or characters are generally pie-shaped and arranged generally around a central point on the display such that the height of at least one of the moveable portions is changed with respect to the others to indicate the general analog clock position corresponding to the time kept on the clock device. Each displayed portion in this embodiment can be at a fixed lateral location in the face of the watch, but change elevates between at least two elevation positions.

The displayed characters can represent at least each of the hours in a 12- or 24-hour period. In one embodiment, up to ten different characters are used, and a separate indicator can be used to indicate, separately or in combination with the displayed character, the remaining hours or other time periods of the clock. Another displayed character can also be used to represent different fractions of an hour. The moveable portions that form at least one of the different characters should be sufficiently close together that any spacing therebetween is substantially undetectable by touch with a human finger-pad or at least easily distinguishable from other protrusions not associated with the character. In another embodiment, the moveable portions are arranged as a seven-segment display, such as a typical digital display found on a digital wristwatch, but operating to be read tactilely instead of by sight.

The characters can also represent at least the minute or elapsed minutes in a given hour. In a preferred embodiment, only the minutes are represented boldly and clearly on the display surface or touch screen to indicate how many minutes have passed in the hour without representation of hour—this embodiment assumes the users is aware of the hour and simply needs the precision associated with the minutes. This embodiment is illustrated and described in more detail herein.

The haptic feedback of each shape can be indicative of a particular grouping of a plurality of minutes, wherein 1 to 12 locations are provided to represent groupings of 30 to 5 minutes, respectively, so that a user by contacting the touch screen can sense the numeric character or shape generated by the haptic feedback and determine the time elapsed within an hour without having to view the touch screen.

The device can also include an indicator portion that feels tactilely elevated or below the surface of the display to indicate the further information relevant to the current time in combination with the displayed character. The indicator can comprise a plurality of indicators, each with a position that in conjunction with the displayed character indicates the current time that is kept on the device. The plurality of indicators can be disposed around the display area in one embodiment, and in another embodiment an indicator is moveable by an actuator along a path to more precisely indicate the time kept on the device in combination with the displayed character.

And as the user is generally aware of the hour, and as it is not generally necessary to be aware of the exact minute, the invention is completely operable when the first vibrations indicate a plurality of elapsed minutes so that the user is informed of approximate time. This could indicate that the user needs to complete a meeting or take other action in advance of a later scheduled appointment or meeting.

It is possible that the hour portion of the display not vibrate to indicate the hour, although that is a preferred embodiment. Hour indication can be a conventional hour marker with a numeral or bar at 1, 2, . . . 11, 12 that is raised or depressed to indicate the hour.

Figure 2:
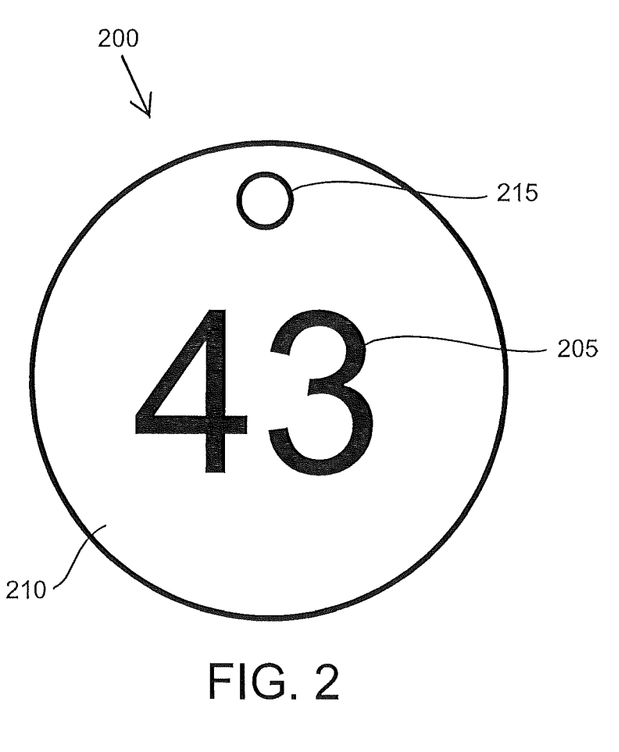
FIG. 2 is a front view of an exemplary embodiment that shows only the minutes largely displayed tactilely on the digital coin timepiece.

FIG. 2 illustrates another exemplary embodiment of a digital coin timepiece 200 that has a display surface that only shows minutes 205 largely displayed tactilely on the display surface or touch screen 210. In this example, the minutes 205 indicate that it is 43 minutes past the hour. Usually, a user would know the hour of the current time but might not always know the minutes or approximate minutes of the current hour. This embodiment also includes one or more indicators, such as 215, which may represent the hour, an activation button, AM/PM, etc. It should also be appreciated that indicator 215 may be optional and is not required. Also, indicator 215 may appear in multiple different formats. For example, indicator 215 may be any number, shape, character, or symbol. In one embodiment, the indicator 215 toggles whether the orientation of the phone is locked or unlocked. Indicator 215 and minutes 205 are not limited to the current position displayed in the view. The position of indicator 215 may also represent information about the current time.

Figure 3:
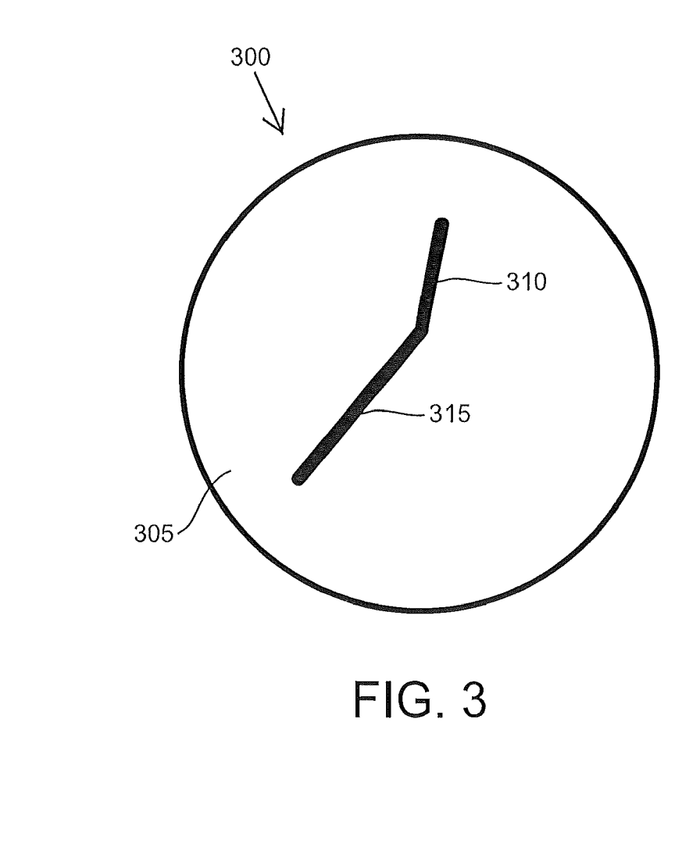
FIG. 3 is a front view of an exemplary embodiment of a digital coin timepiece that shows the skeuomorphic illustration of an analog clock that is tactile.

FIG. 3 illustrates another exemplary embodiment of a digital coin timepiece 300 wherein the display surface provides a skeuomorphic illustration of an analog clock. Digital coin timepiece 300 includes a touch screen 305, an hour hand 310, and a minute hand 315. The hour hand 310 and the minute hand 315 shows the skeuomorphic of an analog clock. In this example, the hour hand 310 and the minute hand 315 indicate that the current time is 12:35. As the user would be aware of whether it is AM or PM, this display alone is sufficient. As in FIG. 1, there would be an indicator provided on the body member to orient the digital coin timepiece so that the user can determine the proper orientation to tell the correct. And while the user should know whether it is AM or PM, a further indicator cam be provided on the touch screen in any one or a number of places to indicate that the time is AM or PM. The AM/PM indicator may also be represented by any number of shapes, symbols, characters, etc.

Figure 4:
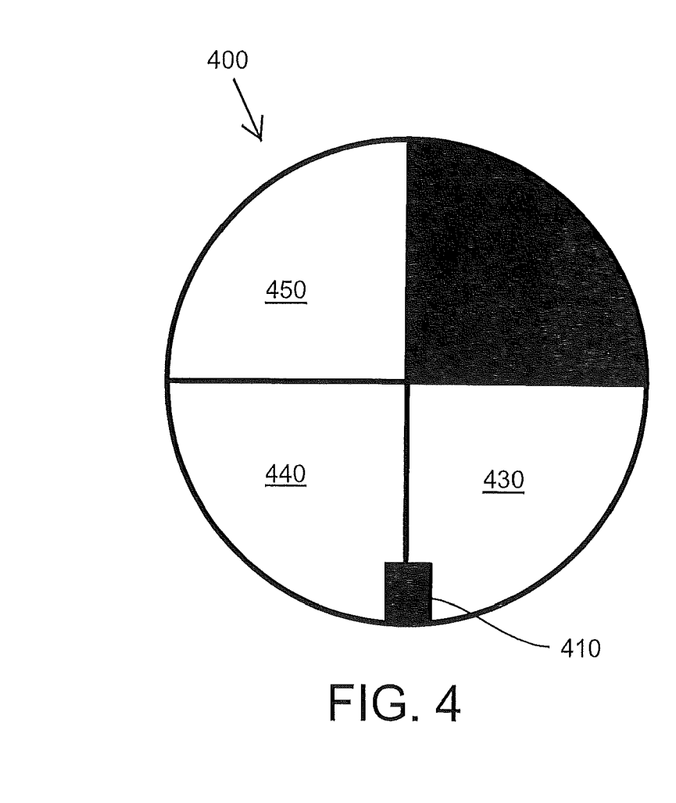
FIG. 4 is a front view of an exemplary embodiment of a digital coin timepiece that shows the hour raised or depressed as a small tactile square at the lower center or six o'clock position and with a large raised (or depressed) square in upper right to approximate minutes.

FIG. 4 is an exemplary embodiment of a digital coin timepiece 400 that shows the hour as a small tactile square 410 at the lower center or six o'clock position of the touch screen and with a large raised (or depressed) square 420 in upper right to approximate minutes. The digital coin timepiece 400 utilizes a quadrant system to indicate elapsed minutes. For example, quadrant 420 represents the minutes of the hour from ":00" to ":15." Quadrant 430 represents the minutes of the hour from ":15" to ":30." Quadrant 440 represents the minutes of the hour from ":30" to ":44." Quadrant 450 represents the minutes of the hour from ":45" to ":59." Thus, after the user determines the hour from the tactile square 410, the elapsed minutes can be determined based on which quadrant is providing a tactile response.

The quadrant system may be organized in a variety of different methods and using a variety of different shapes. In FIG. 4, the current time is between 6:00 and 6:15 PM. This can be used when knowing the precise time is not as important as determining elapsed time as each change in the square represents the passing of a quarter hour rather than the passing of a minute as shown in other embodiments. And instead of a quadrant, a similar result can be obtained by providing a series of four shapes or with each shape representing 15 minutes of elapsed time. These shapes can be arranged in four different areas of the touch screen, or they can be arranged in a line that is either horizontal or vertical or at any other angle. The lines can also be used to indicate the hour by extending only over half the screen in the form or a radius that points to the hour. Again, this would benefit by the inclusion of an orientation indicator.

In related embodiments, there are situations where only the elapsed minutes are needed such that the hour indicator 410 can be omitted or turned off. Thus, the user can determine elapsed minutes by simply touching the display surface and determining how many quadrants are providing tactile responses. And a simplified version of this would be to allow the segments to combine to determine elapsed minutes, e.g., two segments would indicate 30 minutes and three would indicate 45 minutes.

For more specific time management, instead of four segments or quadrants, six segments can be used to represent 10 minute intervals, 10 for six minute intervals, 12 for 5 minute intervals, etc. And the invention would be operable with 60 segments although that arrangement is probably too specific.

The hour indicator 410 represents the current hour of the day. It should be appreciated that the hour indicator 410 may be represented by any number of shapes, symbols, characters, etc. Also, the hour indicator 410 may appear in multiple different positions on the touch screen. As noted, the hour indicator 410 may also be optional.

It is also possible to utilize positions around the perimeter of the touch screen to represent hours. For example, the midpoint of each side can represent the 3 o'clock, 6 o'clock, 9 o'clock and 12 o'clock positions. Alternatively, each ⅓ of the distance of a side of the perimeter of the touch screen face can be used to define a point which can represent one of the hours of the day, so four sides provides 12 points which represent 1 to 12 o'clock respectively. The hour can be indicated by activation of the particular point. The position of the points can mimic a traditional clock or they can be arranged to a particular coding, e.g., starting with 1 in one corner and the increasing with movement sequentially around the perimeter. Of course a skilled artisan can envision many variations on this that would be effective to achieve the benefits and advantages of the present invention.

Figure 5:
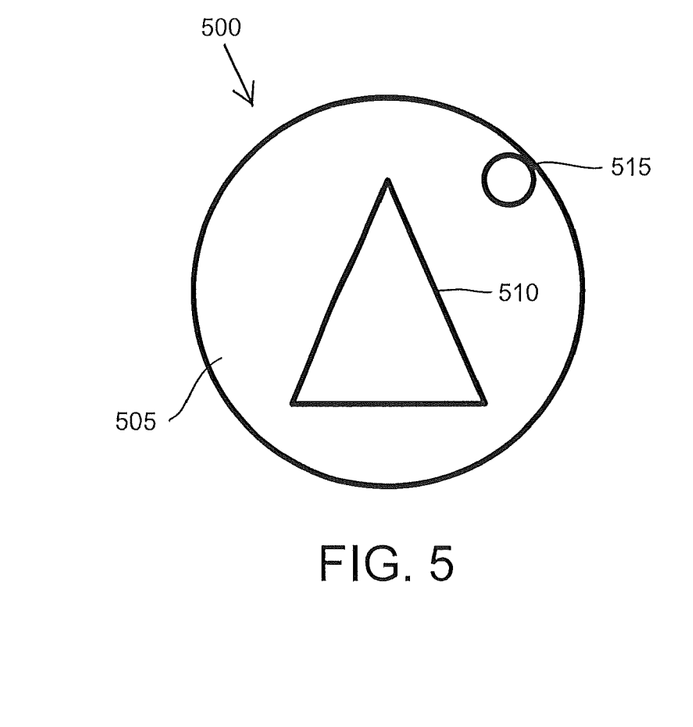
FIG. 5 is a front view of an exemplary embodiment of a digital coin timepiece that shows the hour as a large tactile triangle in the center of the touch screen with the minutes represented by a small tactile circle that orbits around the circumference or watch face.

FIG. 5 is another exemplary embodiment of a digital coin timepiece 500 that shows the hour as a large tactile triangle 510 in the center of the touch screen 505 with the minutes represented by a small tactile circle 515 that orbits around the circumference of the touch screen 505. The hour may be represented by a different shape for each number or only for some numbers because of the difficulty to tactilely read certain numbers such as 2, 5, etc. It should also be appreciated that the touch screen 505 can be configured to provide any combination of numbers, letters, shapes and characters for the hour and minutes. The minute indicator 515 may move along the circumference of the touch screen continuously to represent elapsed minutes. In this FIG. 5, the current time is 5:10.

To further distinguish the tactile feel of the hour from the minutes, the digital coin timepiece 500 may vibrate to indicate which portion of the touch screen 505 is currently being touched. For example, if no portion of the tactile presentation is being touched, then there would be no vibration. If the center portion that provides the hour indicator is touched, then a single or slow vibration can be generated. If the minute portion is touched, then there may be a double vibration or a quick repetitive vibration. The vibration may be an option for a new user of the tactile presentation, to get used to tactilely reading the current time. The correlation of portions of the touch screen and the corresponding vibrations is merely an example and the present invention is not limited to only this example.

Figure 6:
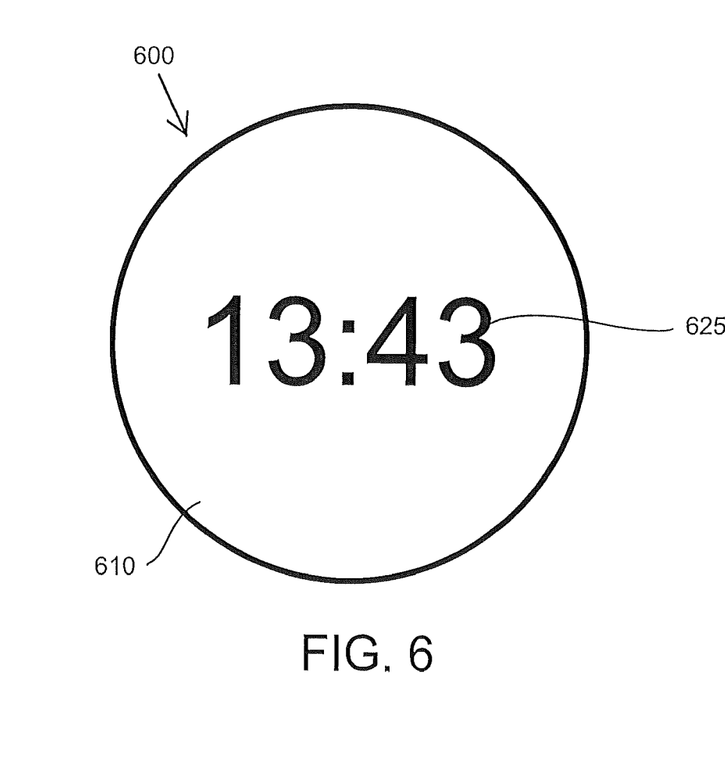
FIG. 6 is a front view of an exemplary embodiment of a digital coin timepiece that shows a tactilely readable digital display.

FIG. 6 illustrates another exemplary embodiment of a digital coin timepiece 600 that shows a tactilely readable display surface 610 that indicates the current time 625. It should be appreciated that the current time 625 may appear in any position on the touch screen 610 as the user would be able to determine it by running his or her finger across the display surface until the indication is understood. In this example, the current time is 13:43 (or 1:43).

Of course, it may not be necessary to indicate whether it is AM or PM as the user of the mobile device would generally know whether it is day or night.

The digital coin timepiece may include one or more mobile applications. The generation of the tactile presentation of the current time may be implemented by the digital coin timepiece and software running on the digital coin timepiece and any combination thereof. The mobile applications, related hand-held or mobile devices, or other discrete software or hardware components can communicate and are arranged to carry out the illustrative processes and applications described herein by way of sending a signal such as a packet, digital message, or a command within a communication to or between components (and act in response to the receipt of a signal to carry our processes) and between or through supporting software or hardware such as communicating with an operating system, communicating with another resident application through an API or the like, communicating between network elements using an Internet protocol or one or more layers of the OSI model, or communicating through an intermediate component. The current time may be obtained from the digital coin timepiece or periodically checked through the Internet for accuracy.

Figure 7:
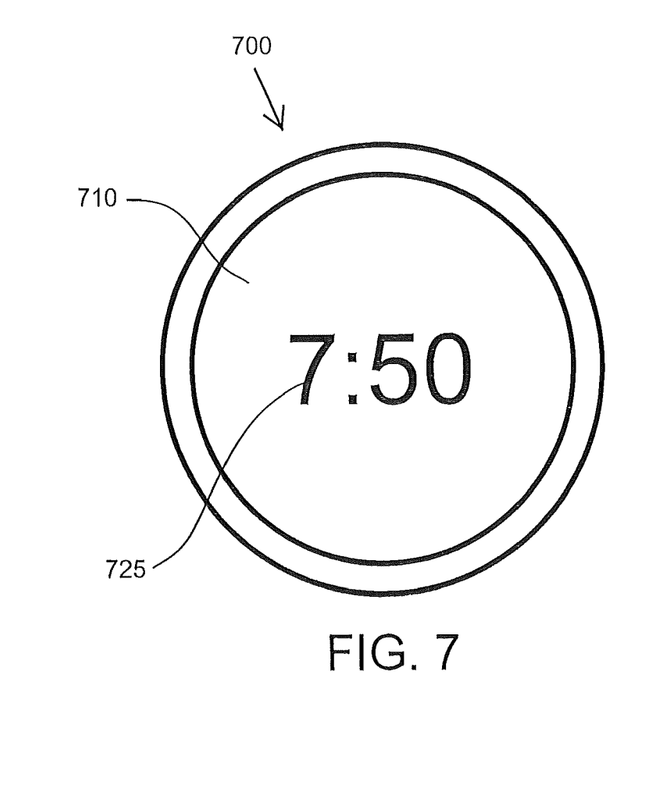
FIG. 7 is a front view of an exemplary embodiment of a digital coin timepiece that shows a tactile readable digital display.

FIG. 7 is yet another an exemplary embodiment of a digital coin timepiece 700 that shows a tactilely readable digital display 710. The digital coin timepiece is in the form of a relatively smooth or flat physical coin that can be stored within a user's pocket and the digital coin may include the functionality to tactilely display the current or approximate time. The digital coin 700 may be powered in a variety of different ways including, but not limited to, batteries, AC adapter, etc. The digital coin 700 may provide the ability for a user to reach into his pocket and feel the time on either side of the digital coin 700. It should be appreciated that the digital coin timepiece 700 may also have many other functions and utilities.

Digital coin timepiece 700 illustrates a simplified view of the present invention with displaying a digital display 710 of the current time 725. It should be appreciated that the digital display 710 may appear in any position within the digital coin timepiece 700. The present invention is not limited to only this example. FIG. 7 shows the current time as 7:50. Of course, it may not be necessary to indicate whether it is AM or PM as the user of the mobile device would generally know whether it is day or night. Alternatively, digital coin timepiece 700 may also include an indicator (not shown) that indicates to the user whether the current time is AM or PM.

Figure 8:
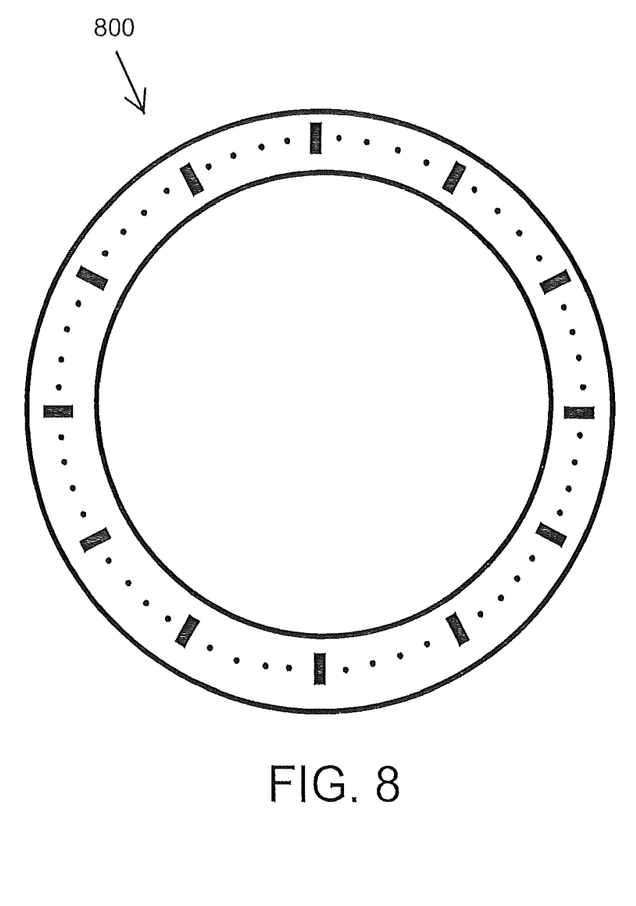
FIG. 8 is a front view a further embodiment of a digital coin timepiece that is configured to inform the user only of elapsed minutes.

In FIG. 8, another digital coin timepiece 800 is illustrated. This one is simplified and utilizes positions or markings around the perimeter of the touch screen to represent elapsed minutes. For example, the midpoint of each side can represent 15, 30, 45 or 60 elapsed minutes. Alternatively, each ⅓ of the distance of a side of the perimeter of the touch screen can be used to define a point which can represent each five minute interval as shown. The elapsed minutes can be indicated by activation of a particular point or line or a series of points or lines, e.g., three points or lines indicating a total elapsed time of 15 minutes. The position of the points can mimic a traditional clock or they can be arranged to a particular coding, e.g., starting with 1 in one corner and the increasing with movement sequentially around the perimeter. Also, this embodiment does not need to have an orientation indicator as the number of point that are activated to provide vibrations indicated each five minutes of elapsed time.

The markings about the periphery of the display surface only tells the time in five minute intervals, but additional indicia can be provided for further refinement. For example, four dots or lines can be added to represent the minutes in between each 5 minute interval so that the actual elapsed minutes can be determined.

Another related embodiment is the use of one type of vibration to determine elapsed minutes and another to indicate the hour. For example, a tactile response of fast vibrations can be used for the indicator of elapsed minutes while a tactile response of slower vibrations can be used to indicate the hour.

In another embodiment, the number of vibrations can be used to indicate elapsed minutes. For example, 1 vibration can be used to designate 5 minutes, 2 vibrations for 10 minutes, 3 for 15 minutes, etc., or for less time sensitive determinations, the digital coin timepiece can be set so that 1 vibration designates 10 or 15 minutes, 2 for 20 or 30 minutes, etc. And the vibration(s) can repeatedly pulse to provide the indication.

Figure 9:
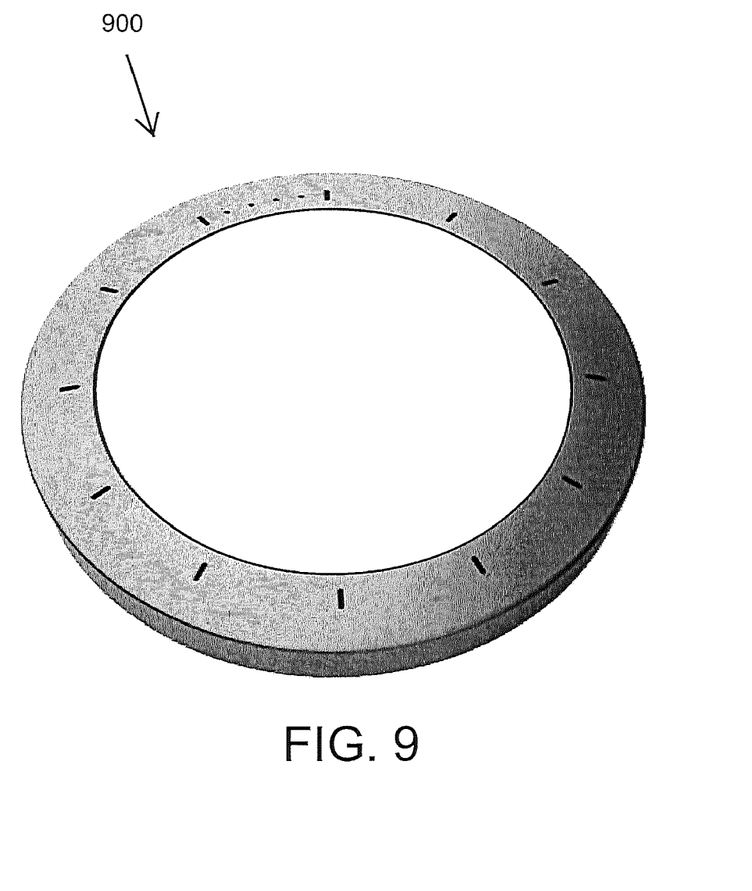
FIG. 9 is a front view of a further embodiment of a digital coin timepiece that is similar to that of FIG. 8.

FIG. 9 illustrates another digital coin timepiece 900 that can be used to determine elapsed minutes. This one is simplified and utilizes positions or markings around the perimeter of the touch screen to simply represent hours, with only four round indicators to indicate elapsed minutes. The first round indicators would be lit by an LED for one first vibration that is used to indicate the first 15 minutes after an hour, the second lights for two second vibrations that indicate between 15 and 30 minutes after the hour, the third indicator lights when three third vibrations are provided to indicate that between 30 and 45 minutes after the hour have elapsed and the fourth indicator lights when four fourth vibrations are provided to indicate that between 45 and 60 minutes after the hour have elapsed. If desired the first and second indicators can be lit to indicate between 15 and 30 minutes of elapsed time, while the first, second and third indicators can be lit to indicate that between 30 and 45 minutes of time have elapsed, while all four indicators can be lit to indicate that the last 15 minutes of the hour are elapsing. And each hour indicator can light up by LED illumination to indicate each particular 5 minutes of elapsed time. And an hour indicator is not necessary because the user would generally know whether it is AM or PM.

And of course the digital coin is designed to provide the haptic vibrations so that the user does not have to look at the coin. The lighted indication of elapsed minutes is a simple convenience when the user wishes to look at the watch rather than touch it to obtain the elapsed minutes. This provides a versatile timepiece that can be viewed or touched to determine elapsed time.

FIGS. 10 to 14 illustrate additional embodiments of digital coin timepieces of the invention in various desirable configurations. The bulls-eye presentation allows the outer and inner rings to represent different times in the hour although in some embodiments, the digital coin timepiece can be in the simple form of a disk that has one flat, concave surface. Smooth convex surfaces can be used instead, if desired, with the device being smooth to the touch and responsive to generate any of the different types of indications that would provide tactile versions of time or elapsed time.

Figure 10:
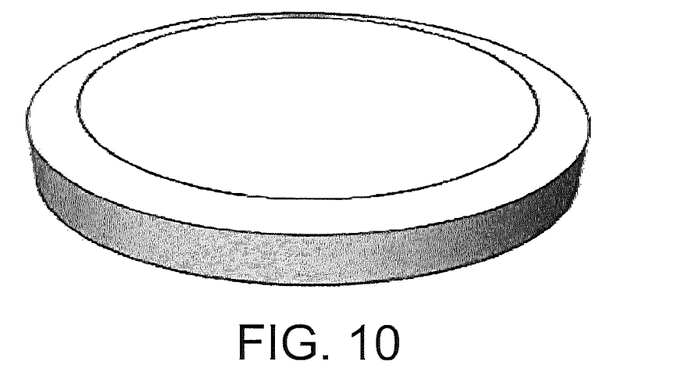
FIGS. 10 to 14 show additional embodiments of digital coin timepieces of the invention in the form of a bulls-eye presentation in which the outer and inner rings can represent different times in the hour (e.g., before or after the hour or half hour) or in the form of a disk that has one flat, concave surface.
Figure 11:
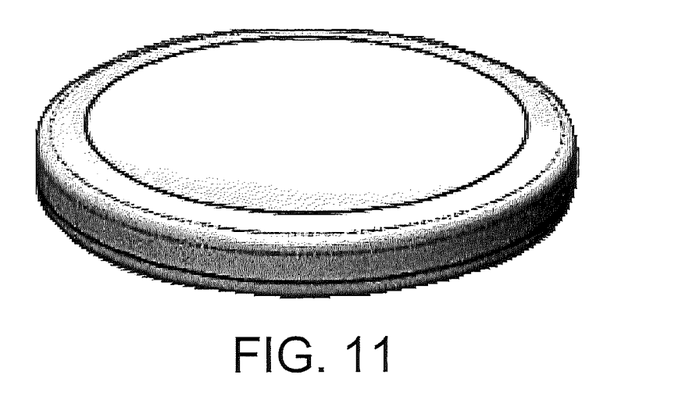
Figure 12:
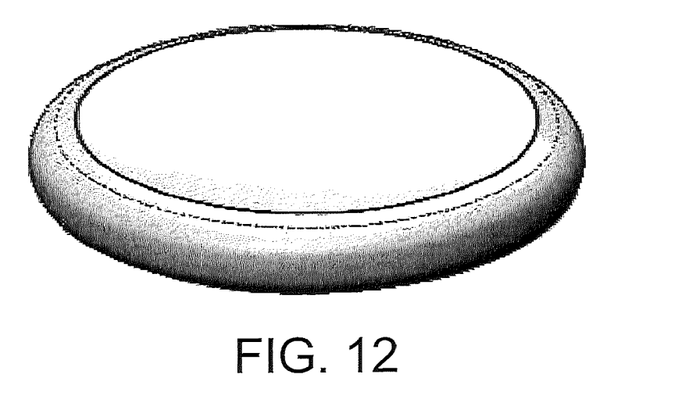

FIGS. 10-12 show three different variations of a smooth surface just digital coin time piece in accordance with the invention. FIG. 10 has more of a flat side whereas FIG. 11 has a rounded top edge and FIG. 12 has rounded top and bottom edges.

Figure 13:
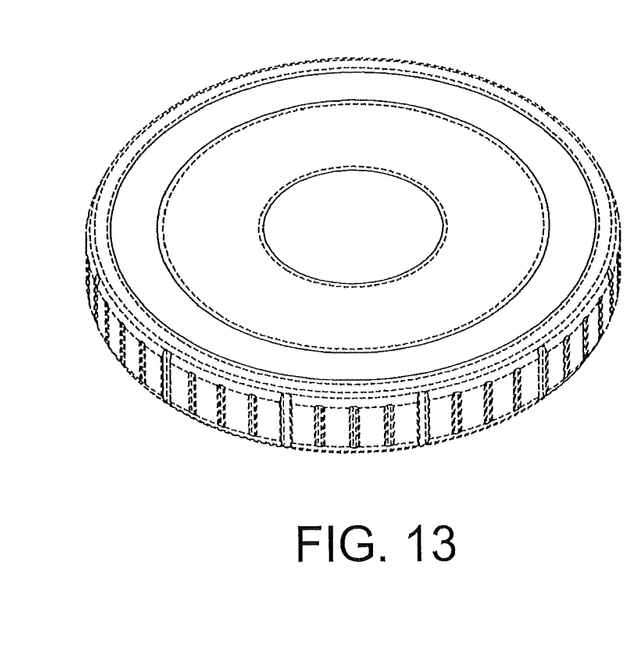
Figure 14:
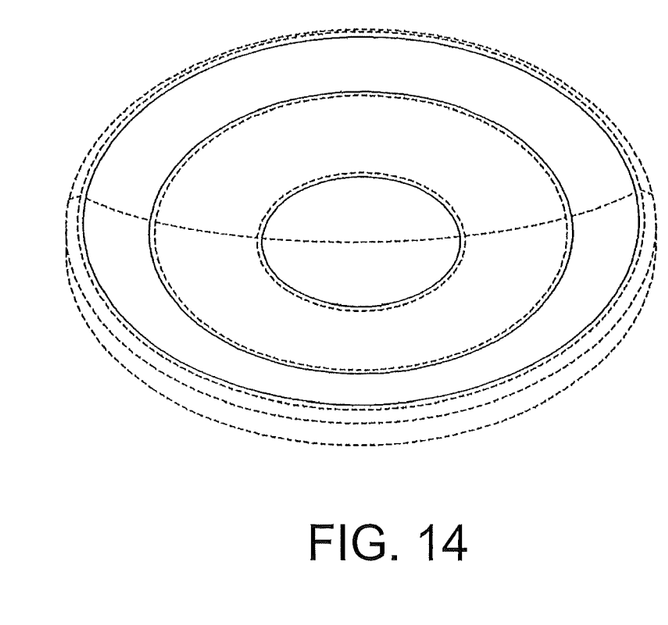

FIGS. 13 and 14 show additional devices that are defined by the solid lines but that include dotted lines to indicate additional embodiments. The preferred designs are those that do not have the additional structure shown by the dotted lines. Similar to FIGS. 11 and 12, these are generally rounded or smoothed portions of the devices shown by the solid lines. The rounded edges and sides provide better feel and comfort when using the device. FIG. 13 also shows in phantom the use of side indicators for certain time increments. Three time increments between each five minutes are shown but this can vary from 2 to 4 increments if desired. Each of the 2 increments would represent 2½ minutes while each of 3 represents 1.6 minutes and each of the four increments represent 1 minute.

Additionally, any of the embodiments of the present invention can be incorporated into other electronic devices that do not have a screen but do have a surface that can be contacted in the same or a similar manner. Thus would include a watch cover or face that has at least some area that can be provided with the functionality to be able to be activated to vibrate or provide other tactilely perceptible forces in at least one portion thereof so that the use can determine the time by feel without having to look at the watch face or casing. For example, the crystal cover can be provided with a peripheral area with the necessary functionality that provides the desired forces as the user runs his or her finger along its circumference in accordance with the principles disclosed herein. The same is possible with an exposed watch face that has smooth portions that can be contacted to tactilely determine the time as disclosed herein.

In the present description, embodiments shown for one Figure can also be considered applicable to other Figures. For example, the activation button that is described in the embodiment of FIG. 1 can also be used for the digital coin timepieces disclosed in the other Figures. The same is true of the AM/PM indicator, the digital coin timepiece orientation indicator, etc.

And in addition to the tactile representations of time, it is also possible to have the tactile portions of the display surface light up or be provided in a different color than the rest of the display surface so that the digital coin timepiece can also be viewed to determine time or elapsed time. This technology is well known in digital watches so that it is not necessary to describe it in further detail herein.

The digital coin timepiece of the invention can also be an article as part of, attached to or worn on a ring, bracelet necklace or earring because it is not necessary to look at the display surface or touch screen to determine the time.

The digital coin timepiece may operate in coordination with application software running external to the hand-held or mobile device to carry out or provide the intended customization and ecommerce application. A computing device can include a computer, computer system or other programmable electronic device, including a client computer, a server computer, a portable computer (including a laptop and a tablet), a handheld computer, a mobile phone (including a smart phone), a gaming device, an embedded controller and any combination and/or equivalent thereof (including touchless devices). Moreover, the computing device may be implemented using one or more networked computers, e.g., in a cluster or other distributed computing system. It is understood that the exemplary environment discussed and illustrated is not intended to limit the present disclosure, and that other alternative hardware and/or software environments may be used without departing from the scope of this disclosure. The present techniques can be applied to devices other than hand-held devices, such as laptops or desktop computers.

For clarity, the terms "computing device", "computer device", "computer" and "machine" are understood to be interchangeable terms and shall be taken to include any collection of computing devices that individually or jointly execute a set (or multiple sets) of instructions to perform any one or more of the methods discussed herein.

The local storage can include volatile memory (such as RAM) and/or non-volatile memory (such as ROM as well as any supplemental levels of memory, including but not limited to cache memories, programmable or flash memories and read-only memories). The portable computing device or mobile device can include one or more processing devices (e.g., one or more central processing units (CPUs), one or more graphics processing units (GPUs), one or more microprocessors (uP) and similar and complementary devices) and optional media devices (e.g., a hard disk module, an optical disk module, etc.). Additionally, any storage techniques used in connection with the presently disclosed method and/or system may invariably be a combination of hardware and software.

In some instances, the term resident application is used to refer to an installed mobile application. However, as a matter of convenience mobile application and resident application are used interchangeably.

One or more features illustratively described herein can be implemented individually or in various combinations. The present system, method, or related inventions also relate to a non-transient computer readable medium configured to carry out any one of the methods disclosed herein. The application can be set of instructions readable by a processor and stored on the non-transient computer readable medium. Such medium may be permanent or semi-permanent memory, such as hard drive, floppy drive, optical disk, flash memory, ROM, EPROM, EEPROM, etc., as would be known to those of ordinary skill in the art.

Features or characteristics described in one context, process, or device are applicable to other context, process or devices described herein. The steps of the processes illustratively described herein can be performed in a different order, if desired. Also, steps could be added or removed from the processes illustratively described herein. The processes illustratively described herein can be implemented using the described examples of hardware and network configurations.

The terms and expressions which have been employed in the specification are used as terms of description and not of limitations, there is no intention in the use of such terms and expressions to exclude any equivalents of the features shown and described or portions thereof, but it is recognized that various modifications are possible within the scope of the claims to the invention.

What is claimed is:

1. A digital coin timepiece that generates a tactile presentation which indicates elapsed time comprising:
   a body member, wherein the body member includes:
      a circumferential border, wherein the circumferential border includes four spaced round windows located on the circumferential border, wherein each window of the four spaced round windows correspond to one of a set of 15 minute time periods, and wherein each window is illuminated with an LED light to indicate which 15 minute time period of the set is occurring; and
      a tactilely readable display surface that provides haptic feedback, wherein the tactilely readable display surface is a surface for contact to obtain the haptic feedback, and wherein the haptic feedback comprises:
         first vibrations in a first location on the tactilely readable display surface when the tactilely readable display surface is touched by a user, wherein the first vibrations represent an actual minute or elapsed minutes so that the user can determine an actual or approximate time without having to view the display surface.

2. The digital coin timepiece of claim 1, wherein the haptic feedback further comprises:
   one first vibration to indicate the first 15 minutes after an hour;
   two second vibrations to indicate between 15 and 30 minutes after the hour;
   three third vibrations to indicate between 30 and 45 minutes after the hour; and
   four fourth vibrations to indicate between 45 and 60 minutes after the hour.

3. The digital coin timepiece of claim 1, wherein the border includes a set of windows at each hour position, and wherein a window of the set of windows emits an LED light to indicate a particular 5 minutes of elapsed time.

4. The digital coin timepiece of claim 1, wherein the haptic feedback further comprises second vibrations in a second location different from the first location, and wherein the second vibrations and the second location are indicative of a particular hour so that the user can determine a time of day as to the actual minute or the elapsed minutes along with the particular hour without having to view the tactilely readable display surface.

5. The digital coin timepiece of claim 4, wherein the first or the second vibrations or both the first and the second vibrations are configured to emulate either a numeric character or minute and hour hands.

6. The digital coin of timepiece claim 4, wherein the first or the second vibrations or both the first and the second vibrations are configured to emulate a discernable shape in a sector location disposed on a portion of the tactilely readable display surface, with 2, 3, 4, 6 or 10 locations provided to represent groupings of 30, 20, 15, 10 or 5 minutes, respectively.

7. The digital coin timepiece of claim 1, wherein the first vibrations indicate a plurality of elapsed minutes so that the user is informed of the approximate time.

8. The digital coin timepiece of claim 1, wherein the haptic feedback is achieved by configuring the tactilely readable display surface to include a glass plate that includes a transparent electrode and an insulator, and wherein when the insulator is contacted by a user's finger, electrical impulses are generated to provide the haptic feedback.

9. The digital coin timepiece of claim 1, further comprising a button for activation of the tactilely readable display surface, wherein when the button is used, the tactilely readable display surface is activated to present the actual or the approximate time.

10. The digital coin timepiece of claim 1, wherein the body member and the tactilely readable display surface are round and the tactilely readable display surface is smooth to the touch.

11. The digital coin timepiece of claim 1, wherein the circumferential border is a raised circumferential border.

12. The digital coin timepiece of claim 1, wherein the surface for the contact to obtain the haptic feedback is a concave surface.

13. A digital coin timepiece that generates a tactile presentation which indicates elapsed time comprising:
   a body member, wherein the body member includes:
      a circumferential border, wherein the circumferential border includes four spaced round windows located on the circumferential border, wherein each window of the four spaced round windows correspond to one of a set of 15 minute time periods, and wherein each window is illuminated with an LED light to indicate which 15 minute time period of the set is occurring; and
      a tactilely readable display surface that provides haptic feedback, wherein the tactilely readable display surface is a surface for contact to obtain the haptic feedback, and wherein the haptic feedback comprises:
         vibrations that indicate periods of 15 elapsed minutes when the tactilely readable display surface is touched by a user, wherein the vibrations vary in response to an elapsed time so that the user by contacting the tactilely readable display surface can sense elapsed 15 minute periods without having to view the tactilely readable display surface.

14. The digital coin timepiece of claim 13, wherein the circumferential border is a raised circumferential border.

15. The digital coin timepiece of claim 13, wherein the surface for the contact to obtain the haptic feedback is a concave surface.

16. A method that generates a tactile presentation which indicates elapsed time on a digital coin timepiece, wherein the method comprises:
   providing the digital coin timepiece according to claim 1 or 13; and
   generating haptic feedback, wherein the haptic feedback comprises:
      vibrations to indicate a particular minute or an elapsed period of minutes, wherein the vibrations vary in response to the particular minute or the elapsed period of minutes to indicate a tactile presentation of the particular minute or the elapsed period of minutes so that a user can determine an approximate time without having to view a tactilely readable display surface of the digital coin timepiece.

17. The method of claim 16, wherein the tactilely readable display surface includes functionality to be able to be activated to vibrate in at least one portion thereof to indicate elapsed 15 minute periods so that the user by activating the tactilely readable display surface can sense the vibrations and the elapsed period of minutes without having to view the tactilely readable display surface.

18. The method of claim 17, wherein the tactilely readable display surface further provides haptic feedback comprising second vibrations at a particular location, wherein the second vibrations and the particular location are indicative of a particular hour so that the user can determine a time of day in both minutes or elapsed minutes and the particular hour without having to view the tactilely readable display surface.

19. The method of any one of claim 16, wherein the vibrations are achieved by configuring the tactilely readable display surface to include a glass plate that includes a transparent electrode and an insulator, wherein when the insulator is contacted by a user's finger, electrical impulses are generated to provide the haptic feedback.

20. The method of claim 16, wherein the tactilely readable display surface is activated by an application of touching, pressure to, or rubbing of a portion of the tactilely readable display surface, or by pressing a button to activate the tactile presentation of the elapsed period of minutes or the particular minute.

21. The method of claim 16, wherein a body member of the digital coin timepiece and the tactilely readable display surface are round and the tactilely readable display surface is smooth to a touch.

22. The method of claim 21, wherein the body member comprises a circumferential border, and wherein the circumferential border includes a set of windows at each hour position, and wherein a window of the set of windows emits an LED light to indicate a particular 5 minutes of elapsed time.

23. The method of claim 22, wherein the circumferential border is a raised circumferential border.

24. The method of claim 16, wherein the haptic feedback further comprises:
- one first vibration to indicate the first 15 minutes after an hour;
- two second vibrations to indicate between 15 and 30 minutes after the hour;
- three third vibrations to indicate between 30 and 45 minutes after the hour; and
- four fourth vibrations to indicate between 45 and 60 minutes after the hour.

25. The method of claim 16, wherein the tactilely readable display surface is a concave surface for contact to obtain the tactile presentation of the particular minute or the elapsed period of minutes.

* * * * *